Feb. 8, 1944.  J. M. NARDI  2,341,466
GAUGE FOR SETTING BORING BAR CUTTERS
Filed July 30, 1943
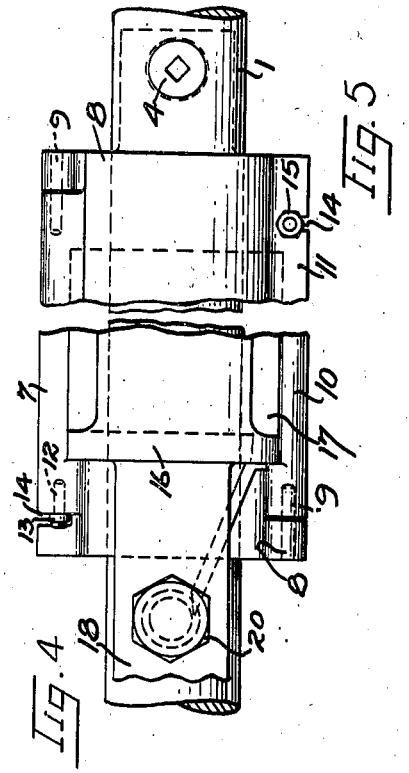
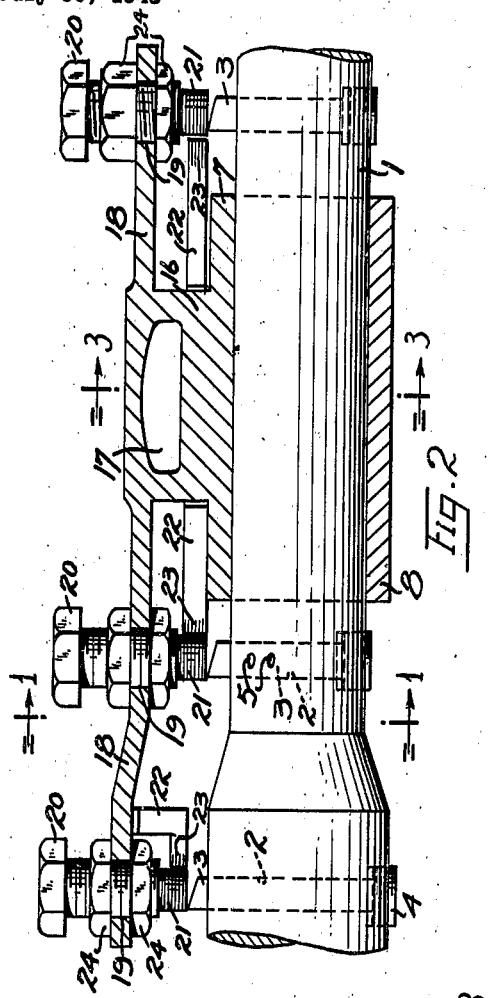
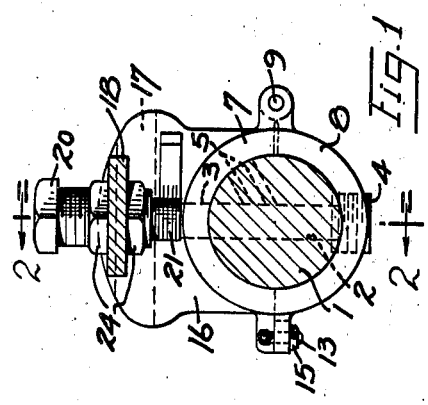
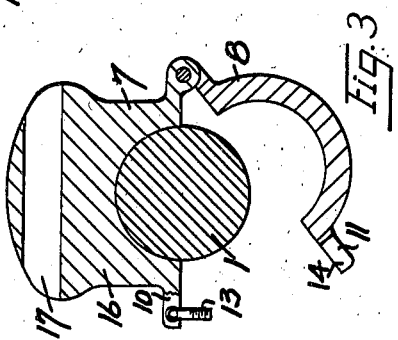
INVENTOR
John M. Nardi
BY Gerald F. Baldwin
Attorney.

Patented Feb. 8, 1944

2,341,466

UNITED STATES PATENT OFFICE 2,341,466

GAUGE FOR SETTING BORING BAR CUTTERS

John M. Nardi, Detroit, Mich.

Application July 30, 1943, Serial No. 496,805

5 Claims. (Cl. 33—185)

This invention relates to improvements in gauges for setting boring bar cutters, and refers particularly to gauges with which a plurality of spaced cutters may be set upon one application of the gauge to the bar.

I am aware that numerous gauges for setting single cutters have already been made but usually they have to be handled by expert mechanics to obtain a sufficiently accurate setting of the cutter to insure that the work bored will be within the required tolerances. Again in most cases the successful operation of the gauge is predicated upon the assumption that the peripheral form of the bar is entirely accurate particularly adjacent its cutter receiving slot or slots, whereas in actual practice, due to the use of wrenches, hammers and the like for securing the cutter in the bar, the periphery of the latter frequently becomes distorted and deformed by blows which it receives. Then gauges of the type which include relatively narrow V-blocks mounted in U-clamps obviously cannot be relied upon for accurate setting. Again such gauges also generally include a set screw to bear against one side of the bar periphery while the V-block bears against the other, with the result that the set screw in time deforms the portion of the bar periphery against which it is repeatedly tightened, and the sides of the narrow V-block similarly distort its opposite side. Consequently a cutter set under such conditions within a thousandth of an inch according to the gauge may well bore a hole many thousandths of an inch larger or smaller than required.

It is an object of this invention to provide a gauge for setting boring bar cutters which may be successfully used by unskilled, production labor with the assurance that the cutters so set will bore holes within the tolerances permitted, even if the bar is slightly deformed or marred.

Another object of the invention is to provide such a gauge wherein the cutter contacting portion or portions may be pre-set, and wherein the body of the gauge consists of hingedly connected substantially semi-circular sleeve portions which swing at right angles to the axis of the bar so that there is no fear of the work contacting portions striking the bar during the mounting or removal of the gauge body.

Another object of the invention is to provide such a gauge for setting boring bar cutters which includes a two-piece cylindrical sleeve of material length to be secured around a boring bar so that depressions in the periphery of the latter will not interfere with the concentric mounting of the sleeve thereon, and in consequence the spacing of the work contacting portions of the gauge, and therefore the cutter setting, will always be entirely accurate.

A further object of the invention is to provide such a gauge for setting a plurality of boring bar cutters upon one application of the gauge to the bar which includes a two-piece sleeve, means for securing the latter concentrically around a bar, and means carried by one piece of the sleeve for accurately gauging and setting a plurality of cutters which may project different distances from the boring bar axis.

Having thus briefly stated some of the objects and advantages of the invention I will now proceed to describe a preferred embodiment thereof with the aid of the accompanying drawing, wherein:

Figure 1 is an end view of the invention in position for use.

Figure 2 is a section on the line 2—2 of Figure 1.

Figure 3 is a section on the line 3—3 of Figure 2 but with the lower semi-circular sleeve portion hanging downward.

Figure 4 is a partial plan view of Figure 2, and

Figure 5 is a partial inverted plan view thereof.

Referring to the drawing, I designates a conventional boring bar having radial apertures 2 therethrough in which cutters 3 are provided to project therefrom, and 4 denotes adjusting screws in engagement with the walls of the bar apertures 2 to bear against the inner extremities of the cutters and prevent their inward movement after they have once been set. In addition other screws as shown at 5 in threaded engagement with openings 6 in the bar 1 may also be employed for securing the cutters in position.

My gauge includes two coacting sleeve portions 7 and 8 the bore of each of which is substantially semi-circular to be secured around and engage the periphery of the bar 1. The portions 7 and 8 are preferably hingedly connected to one another as shown at 9 along one side with the hinge axis parallel with the axis of the bar, and are also provided along their opposite longitudinal margins 10 and 11 respectively. Rotatably mounted on pins 12 carried by the flange 10 are bolts 13 which are adapted to swing into open-ended slots 14 formed in the flange 11 so that nuts 15 on the bolts may be tightened against the underside of the flange 11 to secure the gauge firmly and concentrically around the bar 1. It will thus be noted that the gauge may be held in firm engagement with the bar around substantially its entire periphery and for a material distance along its length so that the gauge setting and its concentricity upon the bar is not affected by localized depressions which may occur along the bar periphery.

Integral with the sleeve portion 7 is a radially projecting body 16 centrally and transversely through which is an opening 17 which forms a handle or grip for holding the gauge and placing it upon or removing it from the boring bar. Extending longitudinally from both extremities of the body 16 are arms 18, and formed through the latter so as to be positioned opposite each cutter 3 is a threaded opening 19 the axis of which is radial to the axis of the bar 1, or the axis of the two sleeve portions 7 and 8 when together in bar engaging position. Extending through each opening 19 is an adjusting screw 20 the inner extremity of which forms a stop for setting the projection of one of the cutters 3. To facilitate the setting of the adjusting screws 20 for a short distance from their inner extremities they are of reduced diameter and have uniformly spaced indicating marks 21 extending around their peripheries. Extending also from the sleeve portion 7, either from the body 16 or from one of the arms 18, are scales 22 having calibrations 23 thereon to coact with the indicating marks 21 on the screws adjacent each of which one of the scales is positioned. For very exact setting the calibrations and indicating marks may be arranged as a vernier scale. By setting the screws 20 and the indicating marks 21 relative to the calibrations 23 the setting of the inner faces of the adjusting screws relative to the bar axis may be readily and accurately determined, and this setting, since the sleeve portions and the bar are co-axial, may be done prior to the mounting of the gauge upon the bar with the assurance that it will be correct and that holes bored by the cutters when set in accordance therewith will be within the tolerances permitted, due to the seating of the sleeve portions 7 and 8 around the entire bar periphery and for a material distance therealong.

24 denotes lock nuts upon the adjusting screws 20 to prevent accidental rotation of the latter after they have once been set.

While in the foregoing the preferred embodiment of the invention has been described and shown it will be understood that alterations and modifications may be made thereto provided the alterations and modifications fall within the scope of the claims; and it will also be noted that in cases where a plurality of cutters are mounted on a single bar that they may all be set upon a single application of the gauge to the bar which is firmly held in position upon the latter by the bolts 13 during the entire operation.

What I claim is:

1. A gauge for setting boring bar cutters including two substantially semi-circular sleeve portions, means for securing the latter to one another to extend around a boring bar in firm engagement with substantially the entire periphery of the latter, at least one arm spaced from the bar and extending from one of the sleeve portions, an adjusting screw in threaded engagement with said arm and projecting through the latter radially to the bar axis, the inner extremity of the screw forming a stop against which the outer end of a cutter projecting from the bar is adapted to be set, and means for accurately measuring the distance from the bar axis to said stop.

2. A gauge for setting boring bar cutters including two substantially semi-circular sleeve portions together adapted to completely encircle a boring bar, hinge means connecting said portions to permit their insertion upon or removal from said bar, coacting means on said portions for drawing them together to firmly engage the entire periphery of said bar, at least one arm spaced from the bar and extending longitudinally from one sleeve portion, an adjusting screw in threaded engagement with said arm and projecting through the latter radially to the bar axis, the inner extremity of the screw forming a stop against which the outer end of a cutter projecting from the bar is adapted to be set, and means for accurately measuring the distance from said stop to the bar axis.

3. A gauge for setting boring bar cutters including two substantially semi-circular sleeve portions of material length together adapted to completely encircle a boring bar, means for securing said sleeve portions to one another to firmly engage the bar around its whole circumference, arms spaced from the bar and projecting longitudinally in opposite directions from one sleeve portion, at least one adjusting screw extending through and in threaded engagement with each arm, the axis of each screw being radial to the bar axis, the inner extremity of each screw forming a stop against which the outer extremity of a cutter projecting from said bar is adapted to be set, and means for accurately measuring the distance from each stop to the bar axis.

4. A gauge for setting boring bar cutters including two substantially semi-circular sleeve portions together adapted to completely encircle a boring bar, hinge means connecting said portions to permit their insertion upon or removal from said bar, flanges on the sides of the sleeve portions opposite the hinge means, means for drawing said flanges together and causing firm engagement of the bar by said sleeve portions, arms spaced from the bar integral with one sleeve portion and extending longitudinally in opposite directions therefrom, at least one adjusting screw extending through and in threaded engagement with each arm, the axis of each screw being radial to the bar axis, the inner extremity of each screw forming a stop against which the outer extremity of a cutter projecting from the bar is adapted to be set, the inner extremities of the screws being of reduced diameter and having indicating marks around their peripheries, a scale carried by the sleeve portion from which the arms extend terminating adjacent each screw, each scale having calibrations thereon opposite and adjacent the indicating marks on one screw for setting the latter relative to the bar axis, and the inner faces of the screws forming stops against which the outer ends of cutters carried by said bar are set.

5. A gauge for setting boring bar cutters including two substantially semi-circular sleeve portions hingedly connected to encircle a boring bar to permit their insertion upon or removal from said bar, flanges on the sides of the sleeve portions remote from the hinge connection, means for drawing the flanges together and the sleeve portions into firm engagement with the bar around its circumference, a body projecting radially from one sleeve portion, arms projecting longitudinally from both ends of said body and spaced from the bar, said body being provided with a handle aperture, adjusting screws extending through and in threaded engagement with said arms, said screws having their axes disposed at right angles to the bar axis and having stops on their inner extremities against which the outer ends of cutters projecting from the bar are adapted to be set, and means for accurately measuring the distance from each stop to the bar axis.

JOHN M. NARDI.